Patented Feb. 17, 1953

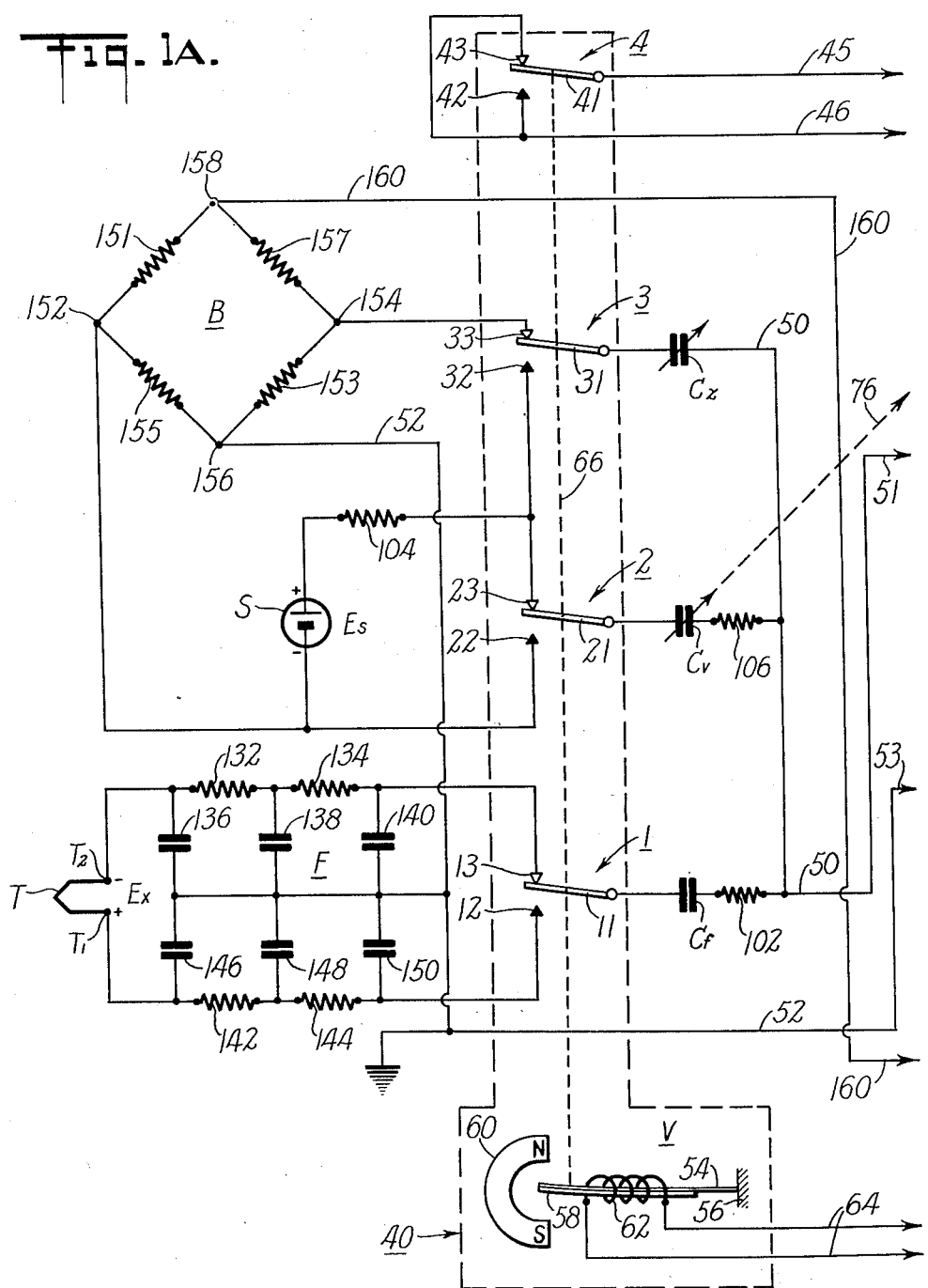

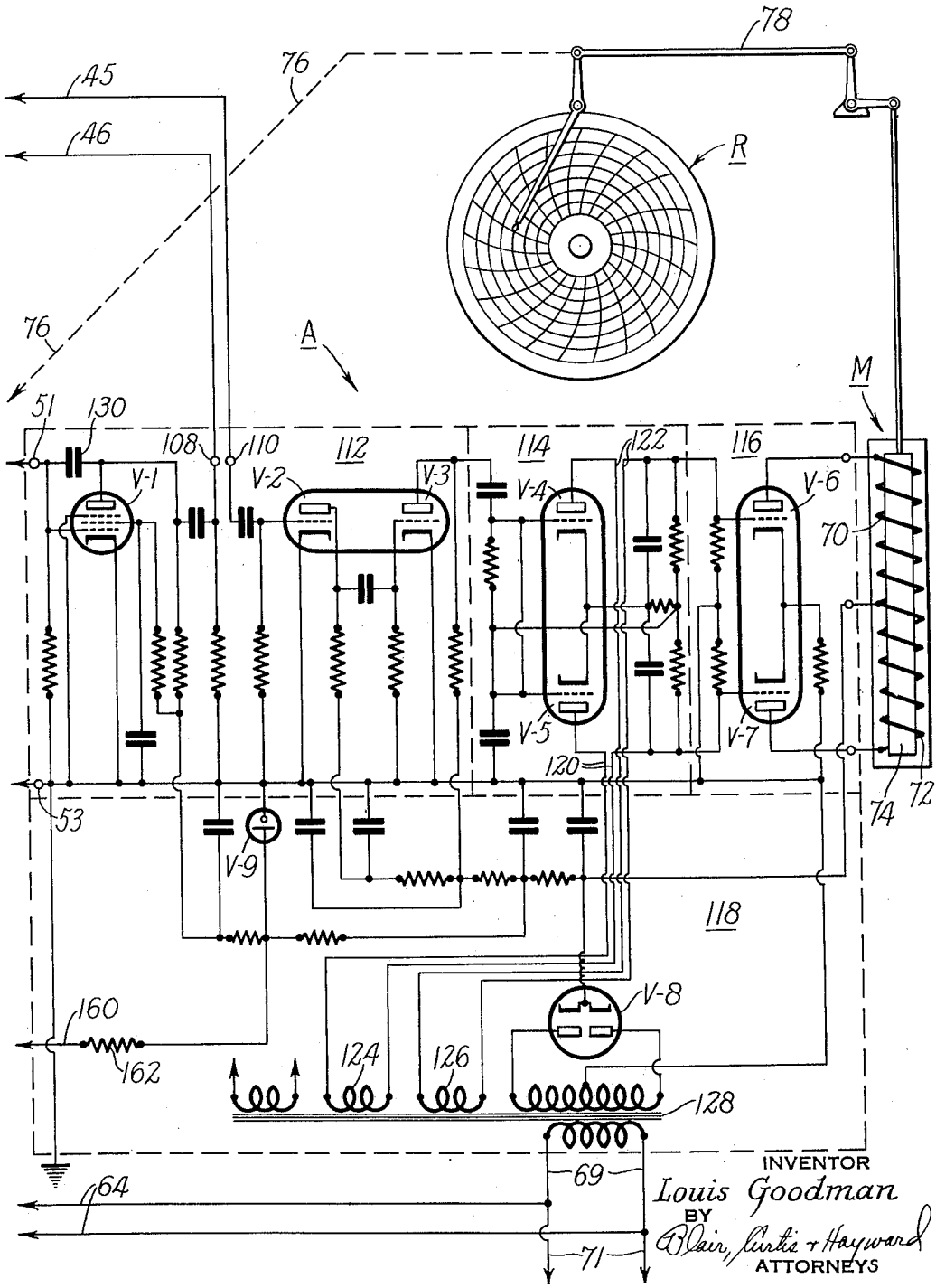

2,628,994

UNITED STATES PATENT OFFICE 2,628,994

SWITCHING ARRANGEMENT FOR ELECTRICAL MEASURING SYSTEMS

Louis Goodman, Millis, Mass., assignor to The Foxboro Company, Foxboro, Mass.

Application October 31, 1947, Serial No. 783,261

13 Claims. (Cl. 171—95)

This invention relates to methods and apparatus for measuring small electrical potentials indicative of the values of variable conditions, and more particularly for measuring small direct current potentials.

More specifically this invention pertains to improvements in the methods and apparatus for measuring such small potentials disclosed in the co-pending application of Wilfred H. Howe, entitled Measuring Apparatus, Serial No. 714,611, filed December 6, 1946. In accordance with the invention of this co-pending application, the unknown potential to be measured, e. g. the potential of a thermocouple, is compared directly with a source of standard potential, e. g. a standard cell, without the necessity for interposing therebetween an intermediate potential-comparing circuit, e. g. a slide-wire potentiometer circuit.

These novel advantages are achieved by interconnecting two or more condensers each with an associated voltage to charge the condensers, and then adjusting one of these associated capacities or potentials to produce a predetermined relationship between their values so that the value of the adjusted element is a measure of quantity being determined. In a preferred arrangement shown in this co-pending application, two condensers are periodically charged, one proportionately to the unknown potential being measured and the other proportionately to the potential of a standard potential source, the charged conditions of these two condensers then are compared, and the capacity of one of the condensers is adjusted automatically until the charge conditions are in balance, i. e. until the relationship $Ex\ Cf = Es\ Cv$ is satisfied, where $Ex$ is the unknown potential, $Es$ is a known potential, $Cf$ is the capacity of a fixed condenser, and $Cv$ is the adjusted capacity of the variable condenser. The cyclic connection of these circuits is accomplished by means of a vibrator-operated multi-pole double-throw switch arrangement. In order to provide most efficient operation, especially at high sensitivities, it is necessary that the making and breaking of the various circuits occur substantially simultaneously. When this vibratory switch is operated at commercial power frequencies, such as 60 cycles, such simultaneous operation required relatively precise adjustments of the contacts of the vibrator to obtain the precise timing desired, i. e. to within a matter of micro-seconds. In normal factory production of commercial instruments of this type it has been found to be quite difficult to accomplish such precise adjustment using normal production procedures. In accordance with the present invention this difficulty is eliminated by the method of operating the apparatus in a cyclical manner and rendering it unresponsive during predetermined portions of the operating cycle when the interconnections of the various circuits are being changed, thus preventing anachronistic makings and breakings of various circuits from producing improper operation of the instrument. In the preferred embodiment of the invention this result is accomplished by the provision of an additional contact element in the vibrator unit, so connected and so synchronized as to allow the instrument to respond only during that portion of each half cycle when all of the other vibrator contacts are definitely closed. This prevents the instrument from being affected by random influences due to slight variations in closure time of the other contacts, and also makes the instrument insensitive to stray voltages that may be induced in the input during the switching interval.

Accordingly, it is an object of this invention to provide improved methods and apparatus for the direct and continuous comparing of unknown electrical values with known electrical values without the need for intermediate standards; as well as for the comparing of unknown values to determine and control the values therebetween; all in accordance with the novel methods and apparatus outlined in the co-pending application identified above.

It is another object of this invention to provide improved methods and apparatus for operating such measuring instruments whereby they are made unresponsive during predetermined portions of their cycle of operations while the circuit interconnections are being changed.

It is a further object of this invention to provide improved circuit arrangements for such apparatus to increase stability and sensitivity.

It is also an object of this invention to provide improved circuits for connecting D. C. condition-sensitive elements such as thermocouples and the like to such apparatus.

Other objects and advantages of this invention will be in part obvious and in part pointed out hereinafter. These objects and advantages are attained by the novel methods and apparatus described in the following specification, and they may be more readily understood by reference to the accompanying drawings in which:

A schematic wiring diagram of a temperature recorder mechanism incorporating the present invention is shown in two portions—Figure 1A and Figure 1B to prevent crowding of the detailed sections thereof.

In the temperature recorder mechanism shown in Figures 1A and 1B, the unknown potential to be measured is that of a thermocouple T connected to a measuring circuit through terminals T1 and T2. The measuring apparatus includes a standard potential cell S, a vibratory-motor-operated four-pole double-throw switch structure, generally indicated by V within the dotted line 40, a fixed condenser $Cf$ associated with the thermocouple T, a variable re-balancing condenser $Cv$ associated with the standard cell S, an amplifier and phase discriminating unit, generally indicated at A, an electrically operated motor mechanism, generally indicated at M, for changing the capacity of the variable condenser $Cv$, and a suitable recorder mechanism, generally indicated at R.

The thermocouple T is connected through a filter circuit, generally indicated at F, to a single-pole double-throw switch element, generally indicated at 1, in the vibrator switch structure V. Its positive terminal T1 is connected to one of the outer contacts 12 of this switch element 1 and its negative terminal T2 is connected to the other outer contact 13 of this switch element. The central contact 11 of switch element 1 is connected to one terminal of the fixed condenser $Cf$. The other terminal of the condenser $Cf$ is connected through a current-limiting resistor 102 and a conductor 50 to one input terminal 51 of the amplifier unit A. The circuit from the other input terminal 53 of the amplifier unit A, which terminal preferably is grounded for shielding purposes, is completed back to the thermocouple circuit through a grounded conductor 52. The positive side of the standard cell S is connected through a protective current-limiting resistor 104 of one outer contact 23 of a second single-pole double-throw switch element, generally indicated at 2, of the vibrator switching structure V; and the negative terminal of standard cell S is connected to the other outer contact 22 of switching element 2. The negative terminal of the standard cell S also is connected through a cold-junction compensating bridge, generally indicated at B and hereinafter to be described, to the grounded terminal 53 of amplifier unit A through grounded conductor 52. The central contact 21 of this switching element 2 is connected to one terminal of the balancing variable condenser $Cv$, the other terminal of which is connected through a current-limiting resistor 106 to the input terminal 51 of amplifier unit A through conductor 50. The contacts 22 and 23 of switching element 2 correspond to contacts 12 and 13 of switching element 1, respectively, and they are arranged so as to be opened and closed simultaneously therewith.

A third switching element, generally indicated at 3, is provided in the vibrator switching mechanism V. A manually adjustable variable condenser $Cz$ is connected between the central contral contact 31 of this switching element 3 and the connection 50 between the common sides of condensers $Cf$ and $Cv$ and the input terminal 51 of the amplifier unit A. One of the outside contacts 33 of this switching element 3 is connected through the cold-junction compensating bridge B and the common grounded conductor 52 to the other input terminal 53 of amplifier A. The other outside contact 32 is connected to the contact 23 of switching element 2. The contacts of switching element 3 are oriented with respect to the contacts of switching elements 1 and 2 so that connection is made between contacts 31 and 32 simultaneously with the closure of the circuit between contacts 11 and 12, and 21 and 22, respectively. With this arrangement the condenser $Cz$ acts as the zero range setting adjustment of the measuring circuit. It is connected to the standard cell S in half cycles alternate to those during which the balancing condenser $Cv$ is connected to the standard cell. Thus the charging of the condenser $Cz$ has an effect on the measuring circuit opposite to that caused by the charging of condenser $Cv$. Thus, effectively, in any one cycle, the algebraic sum of the charges on condensers $Cv$, $Cf$ and $Cz$ for one half cycle is equal to minus their charge in the other half cycle. By proper adjustment of the capacity of $Cz$, this negative effect may be made precisely equal to the positive effect of condenser $Cv$ when the latter is set to its minimum value. This cancels out the effect of the minimum capacity of the balancing condenser $Cv$, and thus the instrument may be made to operate as if condenser $Cv$ had an effective capacity range from zero to its desired maximum value.

By the same token, if the zero-setting condenser $Cz$ is made of sufficient capacity, the effect of $Cv$, $Cz$, and standard cell S can be made negative with respect to the operation described above. Thus the instrument may be used to measure temperatures lower than the temperature of the cold-junction of the thermocouple T when the resultant potential produced by the thermocouple circuit is reversed in polarity with respect to the polarity of the potential produced when the thermocouple is at a temperature higher than its cold-junction temperature. Thus the zero-setting condenser $Cz$ permits such "negative" temperature measurements to be made.

In accordance with the present invention, a fourth switching element, generally indicated at 4, is provided in the vibrator switching mechanism V for rendering the apparatus unresponsive during the predetermined portions of the operating cycle when the center contacts of the other switch elements 1, 2 and 3 are being transferred from one outside contact to the other and vice versa. The outside contacts 42 and 43 of this switching element 4 are connected together and, through a conductor 44, to a terminal 108 on the amplifier unit A, and the central contact 41 of this switch element 4 is connected through a conductor 45 to another terminal 110 on the amplifier A. These terminals 108 and 110 of amplifier unit A are connected in the amplifier circuit, as will hereinafter be described, to render it inoperative during the switching interval portions of the operating cycle of the instrument when central contact 41 of switch element 4 is out of contact with its associated outer contact elements 42 and 43.

The driving means for operating the switching elements 1, 2, 3 and 4 of the switching unit V might be any suitable mechanism capable of operating these switching elements in synchronism at some desired frequency such as the frequency of a commercial alternating current power supply line. In the described embodiment of this invention, the driving mechanism is a vibrator arrangement formed of a resilient reed-like member 54 anchored at one end 56 and carrying on its other end an armature portion 58 which is positioned between the poles of a permanent magnet 60. A winding 62, surrounding the magnetic portion 58, is connected to lines 64 supplying power at the desired operating frequency from power supply lines 71. With this arrangement, the polarity of the free end of the armature 58 changes at the operating frequency, thus causing it to move back and forth between the poles of the permanent magnet 60. The motion of the armature 58 is transmitted by some suitable mechanical means, shown diagrammatically by the broken line 56, to the center contacts 11, 21, 31, and 41 of the switching elements 1, 2, 3, and 4, respectively, to cause these contacts simultaneously to alternately make and break contact with their respective contacts 12 and 13, 22 and 23, 32 and 33, and 42 and 43 at the frequency of the power supply 71. A rotary commutator arrangement driven by a synchronous motor forms another simple and efficient mechanism for accomplishing this synchronized switching operation.

The condensers $C_f$, $C_v$ and $C_2$ are discharged periodically by the action of this vibrator V in connecting them to ground through the contacts of switch elements 2 and 3. This periodic action not only provides a comparison of the relationship produced by the charges on the condensers with the selected reference condition, i. e. an effective zero value which serves as an axis of measurement of the unbalance potential; but, due to the rapidity of its operation, it provides an alternating unbalance potential which may be readily amplified by conventional amplifiers.

The times of opening and closing of the various contacts in the switching unit V are so adjusted that the contacts of switch element 4 always open before the opening of the contacts of switch elements 1, 2, and 3, and always close after the closing of the contacts in these latter switch elements. Although, of course, it is desirable for the contacts of the other switch elements all to open and close simultaneously, a condition practically impossible of accomplishment in such vibratory mechanisms constructed with the methods and tolerances practiced in usual mass production manufacturing operations, with an arrangement in accordance with the present invention in which switch element 4 opens first and closes last, the particular sequence of opening and closing of the other switch elements is relatively unimportant. In actual operation it has been found quite satisfactory to have switch elements 2, 3 and 1 operate in that order, although sequences 1, 3 and 2, and 3, 1 and 2 have likewise been found to be satisfactory. In all instances, however, it is important that switch element 4 open its circuit before any of the others and close it after all of the others have closed. Further, it is desirable in such an arrangement to introduce sufficient delay between opening of the contacts of switch element 4 and the opening of elements 1, 2 and 3, and between the closing of the contacts of switch elements 1, 2 and 3 and the closing of the contacts of switch element 4, to insure the disappearance of any residual or parasitic voltages created by asynchronous operation of the contacts of switch elements 1, 2 or 3 so that the instrument will not amplify and respond to spurious voltages produced during the switching interval.

The amplifier unit A may be any suitable electronic tube amplifier system capable of properly amplifying the unbalance A. C. potentials from the measuring circuit applied between the terminals 51 and 53, and of comparing the phase of this amplified potential with the phase of the voltage delivered by the supply lines 64, introduced into the amplifier unit A through conductors 68. It is preferable that this amplifier have a sufficiently high input impedance so as to present a negligible load to the thermocouple and standard cell circuits i. e. one which will not detrimentally affect the accuracy of measurement. Further, it is desirable that this unit A be highly sensitive only to the synchronizing frequency supplied by supply lines 64 by the provision of suitable frequency selective circuits so as to limit the response of the instrument to the unbalance potentials developed in the measuring circuit just described. The power supply for operating this unit A preferably is derived from the supply lines 69. The comparison of the phases of these two potentials determines the relative energization of two sections 70 and 72 of the winding of the solenoid motor M. An amplifier and phase differentiating unit suitable for use as the unit A is disclosed and described in detail in the copending application of Wilfred H. Howe and Robert W. Cushman, Serial No. 496,438, filed July 28, 1943, entitled Measuring Apparatus. The circuit diagram of a suitable unit of this type is shown in Figure 1B.

This amplifier unit comprises a three stage vacuum tube voltage amplifier unit, generally indicated at 112; a phase differentiating circuit, generally indicated at 114; a power controlling output stage, generally indicated at 116; and a power supply unit, generally indicated at 118. The unbalanced voltage from the condition-sensitive portion of the instrument, shown in Figure 1A, applied to the terminals 51 and 53 of the amplifier unit A is amplified by the voltage amplifier portion 112 and applied to the phase discriminating circuit 114. The two vacuum tubes V-4 and V-5 in this discriminator stage 114 are supplied, respectively, with two oppositely-phased A. C. voltages synchronized with the voltage supplied to the winding 62 of vibrator V through two pairs of conductors 122 and 120 connected, respectively, to two windings 126 and 124 of the power transformer 128 in the power supply portion 118 of amplifier unit A. The primary of this transformer 128 being connected to the power supply line 71 in parallel with the winding 62 of vibrator V. Inasmuch as the amplified unbalance voltage from the condition-sensitive portion of the instrument applied to terminals 51 and 53 of amplifier unit A is in phase with the voltage applied to one of the two tubes V-4 and V-5 in the phase discriminator stage 114 from transformer 128 and out of phase with the voltage applied to the other of these two discriminator tubes, or vice versa, either one or the other of these tubes will be rendered operative by this amplified unbalance voltage, and in turn, will control the flow of power through one or the other of the two tubes V-6 and V-7, respectively, in the power control stage 116 to control the differential energization of the two windings 70 and 72 of motor M.

In order to stabilize the instrument and provide it with desirable operating characteristics certain special provisions are made in the amplifier. It is provided with considerable gain in excess of that necessary to provide an instrument substantially without dead space, and then this excess gain is decreased to the amount normally required by the provision of high-pass negative feedback circuit in the first tube of the amplifier. Because the parasitic or inconsistent portions of the signals received from the condition-sensitive portion of the instrument are primarily of frequencies higher than the fundamental frequency of operation of the vibrator V, the above provisions stabilize the operation of the instrument by making it relatively poorly responsive to higher frequencies due to these circuit arrangements which cause the amplifier to act substantially as low-pass device. At the same time, this feedback arrangement tends to make the amplifier performance less critical of the specific constants of the particular tubes used. Further this feedback arrangement increases the time constant of the input circuit of first tube V-1 of amplifier 112 so that the changes in the grid resistance of this tube V-1 do not critically affect operation of the amplifier. At the same time this feedback circuit causes the effective impedance of the input circuit of tube V-1 to be greatly reduced during the open circuit portions of the switching interval so as to minimize the effects of such switching transients as may appear during that interval. To stabilize the operation of the amplifier unit A, a voltage regulator tube V-9 is provided in the power supply unit 118 to reduce changes in the operating potentials applied to the tubes due to the changes in voltage of the power supply line 71. In addition, this voltage regulator tube V-9 provides a regulated voltage to energize the cold-junction temperature compensating bridge B, hereinafter to be described in greater detail.

This feedback effect is developed in first tube of the voltage amplifier stage 112 by the provision of the condenser 130 between the plate and grid thereof in such a manner also as to provide a sensitivity compensating effect as the range of the instrument is changed. When the range of the instrument is reduced, e. g. changed from a 0° to 500° F. range to a 0° to 50° F. range, it is necessary that the sensitivity of the instrument be increased. This is desirable, as explained in the above-identified co-pending patent application, because, as the range is decreased, the voltage produced by a given thermocouple decreases and therefore, a larger fixed condenser Cf must be used in order to obtain a balance with the same variable condenser Cv over the same width of chart in the recorder R. This increase in the size of fixed condenser Cf, however, puts a greater capacity between the grid and the cathode of the amplifier input vacuum tube V-1 which, in turn, causes a decrease in the feedback of this tube, thus increasing its amplification and hence the sensitivity of the instrument on smaller measurement ranges.

As shown in Figure 1B, the terminals 108 and 110 of amplifier unit A which are connected through conductors 45 and 46 to switching element 4 as described above, are connected between the plate circuit of the first vacuum tube V-1 of the voltage amplifier unit 112 and the grid circuit of the second vacuum tube V-2 in this amplifier unit. This arrangement opens this coupling circuit, thus preventing any signal from being fed through the remainder of the voltage amplifier stage 112 to the discriminating stage 114 to operate the power output control stage 116 during any period when the moving contact 41 of switching element 4 is out of contact with either of its associated contact points 42 and 43. Thus the amplifier unit A is rendered ineffective during the switching interval of the normal operating cycle of the apparatus.

The solenoid motor M also may be of any suitable type, as, for example, that described in the above-mentioned co-pending application. The armature 74 of this motor M is connected by a suitable mechanical linkage arrangement, shown diagrammatically as a lever system 78, to a pen 80 of the recorder mechanism R, and to the balancing variable condenser Cv by an additional interconnecting mechanical linkage, shown diagrammatically by the broken line 76. Thus, the condition-sensitive portion of the instrument, shown in Figure 1B, is balanced and the position, and thus the capacity, of the balancing condenser Cv is recorded on a chart 82 as a measure of the temperature to which the thermocouple T is exposed.

In measuring instruments embodying the present invention, it can be seen that the unknown potential, i. e. the potential Ex of thermocouple T, is compared directly and continuously with a known potential, i. e. the potential Es of the standard cell S, through the medium of the charge on two condensers Cf and Cv without the need of the intermediate potentiometer circuit customarily employed in such measurements. Whenever a change in the unknown potential alters the network potential relationship, the amplifier unit A, motor M, and linkage 76 operate to adjust the variable condenser Cv in the proper direction and in an amount which tends to restore the desired potential distribution for a condition of balance. The use of a variable condenser as the rebalancing element and of an electronic unbalance detecting mechanism permits so fast a rebalancing action that such an instrument can follow changes in a condition which would be much too rapid to be followed by the usual slide-wire potentiometer-type instrument.

In commercial instruments embodying the present invention for measuring temperature with a thermocouple, certain additional adjustments and refinements are usually required and these are provided by the novel arrangements herein described.

A measuring instrument of this type has the advantage that the current drain on the thermocouple and on the standard cell is not only extremely minute, but also that it is substantially constant at all times regardless of state of balance or unbalance of the measuring circuit. In contrast, in the usual potentiometer-type thermocouple potential measuring circuit, when the instrument is away from its balance point, an appreciable current is drawn from these elements which may seriously affect the accuracy of measurement. This feature of the present invention advantageously permits any number of indicating, recording, and controlling instruments to be operated from a single thermocouple element because of the constant load on the thermocouple so that there is no interaction between multiple instruments so connected. Furthermore, although the use of capacities in the measuring circuit permits this advantageous operation, because operation of the invention depends upon the charge in the condensers employed rather than on their impedance, satisfactory operation of this measuring apparatus is substantially independent of the power factor of the condensers used, i. e. of the quality and constancy of the condenser insulation.

Further as above stated, it is convenient and desirable to use a commercial power supply frequency as the synchronous frequency for operation of the vibrator V and the phase differentiator circuit 114 in the amplifier unit A. An advantage of the present invention is that such use of a commercial power supply is possible without the necessity of expensive equipment to overcome interference effects normally produced by such use. In such installations, it is important to prevent stray power supply pickups from affecting the operation of the instrument. At the same time, in order to provide a commercially practical instrument, it is necessary that the thermocouple and its leads not require extensive shielding, i. e. the instrument should be operable with commercial thermocouple installations already in existence. In order to permit such desirable operation, a filter arrangement F is provided, as mentioned above, between the terminals T1 and T2 of thermocouple T and the input terminals 51 and 53 of amplifier unit A. This filter arrangement is a balanced filter network comprising two identical filter circuits connected opposite each other in each of the thermocouple leads and to the common conductor 100. The first filter network comprises two series-connected resistors 132 and 134 connected from terminal T2 of thermocouple T to contact 13 of switch element 1, and three condensers 136, 138 and 140 connected from the terminals of these resistors to conductor 100; and the second filter network comprises two similar resistors 142 and 144 series connected from terminal T1 of the thermocouple T to contact 12 of switch element 1 with three similar condensers 146, 148 and 150 connected from the terminals of these resistors to conductor 100. The particular value of these filter circuit constants are so chosen as to provide high attenuation of the frequency of the commercial power supply line 71.

Since the condensers in this filter system constitute an effective low impedance A. C. center tap across the thermocouple T, it provides an effective return connection to the grounded terminal 53 of the amplifier unit A from the thermocouple circuit. At the same time this filter circuit serves to isolate the thermocouple from the remainder of the instrument insofar as D. C. is concerned. Thus accidental grounding of one side of the thermocouple does not detrimentally affect the operation of the instrument. The operation of this filter arrangement is such as to provide effective filtering even though one side of the thermocouple is accidentally grounded. Under such a condition, although the filter in the grounded side of the thermocouple ceases to function, the filter in the ungrounded side functions effectively to filter out pickup from the power supply lines. Furthermore, this non-conductive connection of the thermocouple to the instrument is advantageous in the operation of multiple instruments on a single thermocouple without interference therebetween.

In order to compensate for changes in the temperature of the cold-junction of thermocouple T, there is provided, as mentioned above, a cold-junction temperature compensating bridge circuit B. This compensating bridge B comprises four resistors 151, 153, 155 and 157 connected in a Wheatstone bridge type circuit having four corners or terminals 152, 154, 156 and 158. The two resistors 151 and 153 connected between terminals 152 and 158, and 154 and 156, respectively, are made of constantan wire or other similar metal having a substantially zero temperature-resistance coefficient; whereas resistor 155, connected between terminals 152 and 156, and resistor 157, connected between terminals 154 and 158, are formed of wire made of nickel or other similar material having a relatively high resistance-temperature coefficient. One terminal 152 of this compensating bridge B is connected to the minus terminal of standard cell S while the opposite terminal 154 is connected to the outer contact 33 of switch element 2. The lower terminal 156 of the bridge is connected to grounded conductor 52 and its opposite terminal 158 is connected through a conductor 160 and a voltage-dropping resistor 162 to the high voltage side of the voltage regulator tube V-9 in the power supply 118.

The resistors of this bridge circuit B, or at least the temperature responsive resistors 155 and 157, are positioned in close proximity to the cold-junction of thermocouple T so that they are maintained at substantially the same temperature as this cold-junction. With this arrangement there is developed between terminals 152 and 154 of compensating bridge B a potential which is a function of the temperature of the cold-junction of thermocouple T. This potential is applied through the contacts of switching elements 2 and 3 to condensers $C_v$ and $C_2$, in addition to the application thereto of the potential $E_s$ of the standard cell S, to alter the charge conditions of these condensers by an amount which is dependent upon the temperature of cold-junction of thermocouple T so that the resulting temperature measurements of the apparatus are independent of changes in cold-junction temperature.

In an actual instrument for measuring temperatures up to about 1000° F. with a commercial iron-constantan thermocouple and a regular Epley standard cell, approximate values of circuit components which have been found to provide satisfactory operation are: $C_f = .01$ microfarad, $C_v = 75$ to 275 micromicrofarads, and $C_2 = 50$ micromicrofarads. For a range of 50° F. cold-junction temperature change, resistors 151, 153, 155 and 157 in the compensating bridge B may have values of about 500 ohms, and the voltage dropping resistor 162 a value of about 100,000 ohms when tube V-9 is a 150 volt regulating tube. Values which are suitable for the symmetrical filter network F are: resistors 132, 134, 142 and 144 = 10,000 ohms, and condensers 136, 138, 140, 146, 148 and 150 = 4 microfarads. The amplifier unit A advantageously might have an input impedance of about 5 megohms. Current-limiting resistors 102 and 106 may have a value of about 1000 ohms. The maximum currents drawn from the thermocouple and the standard cell by an instrument having such circuit values will not exceed 0.1 micro-ampere.

As many possible embodiments of the present invention may be made without departing from the scope thereof, it is to be understood that all matter set forth in this specification or shown in the accompanying drawings is to be interpreted as illustrative only and not in a limiting sense.

I claim:

1. In apparatus for comparing two D. C. potentials, in combination, two condensers, potential-variation detecting means, periodic switching means including electrical connecting means having alternate positions for periodically interconnecting said condensers with said D. C. potentials in two alternate circuit networks, means connecting said detecting means to measuring points in said circuit networks to permit detection of potential variations between said measuring points as said switching means switches from one to the other of said alternate circuit networks, means connected with said periodic switching means for rendering said detecting means ineffective during the portions of the cycle of operation of said switching means when said electrical connecting means are intermediate their alternate positions, and control means responsive to the magnitude and polarity of said potential variations forming a measure of the value of one D. C. potential with respect to the value of the other.

2. In apparatus for comparing two D. C. potentials, in combination, two condensers, potential-variation detecting means, periodic switching means including electrical connecting means having alternate positions for periodically interconnecting said condensers with said D. C. potentials in two alternate circuit networks, means connecting said detecting means to measuring points in said circuit networks to permit detection of potential variations between said measuring points as said switching means switches from one to the other of said alternate circuit networks, means connected with said periodic switching means for rendering said detecting means ineffective during a period synchronous with but in excess of that portion of the cycle of operation of said switching means when said electrical connecting means are intermediate their alternate positions, and control means responsive to the magnitude and polarity of said potential variations forming a measure of the value of one D. C. potential with respect to the value of the other.

3. In apparatus for comparing two D. C. potentials, in combination, two condensers, high impedance potential variation detecting means, periodic switching means including electrical connecting means for periodically interconnecting said condensers with said D. C. potentials in alternate circuits, means connecting said detecting means with said circuits to permit detection of potential variations at a measuring point in said alternate circuits as said switching means switch from one to the other of said circuits, means operated by said periodic switching means for rendering said detecting means ineffective during the switching portions of the cycle of operation of said switching means when said alternate circuits are not completed, and means under the control of said variation detecting means for adjusting the value of one of said condensers to reduce said potential variations to zero whereby the adjusted value of said condenser with respect to the value of the other condenser is a measure of the value of one D. C. potential with respect to the value of the other.

4. In apparatus for comparing a known D. C. potential with an unknown D. C. potential, in combination, a fixed condenser, a variable condenser, first and second alternate circuit networks, potential change detecting means, cyclically-operated switching means including electrical connecting means for cyclically interconnecting said condensers with said D. C. potentials in said alternate circuit networks to produce a potential distribution therein, means connecting said detecting means in said circuit networks to detect potential changes in said circuit networks as said switching means switches said condensers and said D. C. potentials from one alternate circuit network to the other, means operated by said switching means for rendering said detecting means ineffective during the period when said condensers and said D. C. potentials are being switched from one alternate circuit network to the other, and means for adjusting the value of said variable condenser to tend to reduce said changes of potential to zero whereby the adjusted value of said variable condenser may be calibrated to be a measure of the value of the unknown D. C. potential.

5. In apparatus for measuring temperature in which a thermocouple element is exposed to the temperature to be measured and connected in a circuit to produce a D. C. voltage which is a function of said temperature, the combination comprising a D. C. voltage circuit including first and second terminals connected to a source of unknown D. C. voltage to be measured, a first condenser, a standard cell circuit having output terminals and circuit including a standard potential cell, a second condenser, first connecting means joining one terminal each of said D. C. voltage and standard cell circuits, second connecting means joining one plate of each of said condensers, cyclically-operated first switching means for periodically connecting the other plate of said first condenser alternately from one terminal to another of said D. C. voltage circuit, second switching means operated in synchronism with said first switching means for periodically connecting the other plate of said second condenser alternately from one terminal to another of said standard cell circuit, voltage sensitive means connected between said first and second connecting means and responsive to change of voltage therebetween, third switching means operated in synchronism with said first and second switching means and connected to said voltage-sensitive means to render the latter ineffective during the period that the second-mentioned plates of said condensers are out of contact with the terminals of said D. C. voltage circuit and said standard cell circuit respectively, and means under control of said voltage-sensitive means for adjusting the value of said second condenser in a direction tending to apply the same voltage to said voltage-sensitive means when said cyclically-operated switching means make each of their alternate connections, whereby the adjusted capacity of said second condenser is a measure of the voltage being measured when said alternate voltages are equal.

6. Apparatus for measuring an unknown D. C. potential, comprising, in combination, a first circuit having connecting terminals and including a source of the unknown D. C. potential to be measured, a first condenser, a second circuit having connecting terminals and including a source of known D. C. potential, a second condenser, a third condenser, first connecting means joining one terminal of each of said first and second D. C. potential circuits, second connecting means joining one plate of each of said condensers, cyclically-operated first switching means for periodically connecting the other plate of said first condenser alternately from one terminal to another of said unknown D. C. potential circuit, second switching means operated in synchronism with said first switching means for periodically connecting the other plate of said second condenser alternately from one terminal to another of said known D. C. potential circuit, third switching means operated in synchronism with said first and second switching means for periodically connecting the other plate of said third condenser alternately from one terminal to another of said known D. C. potential source in inverse order to the similar connection made by said second switching means, said first, second and third switching means each having switching contacts and alternate terminals voltage-sensitive means connected between said first and second connecting means, means to set said third condenser to determine the zero axis of measurement, fourth switching means operated in synchronism with said other switching means and connected to said voltage-sensitive means to render the latter ineffective during the period when the contacts of said other switching means are out of engagement with their respective alternate terminals, and means under control of said voltage-sensitive means for adjusting the value of said first or second condenser in a direction tending to apply the same voltage to said voltage sensitive means when said cyclically-operated switching means make each of their alternate connections, whereby the capacity of said adjusted condenser is a measure of the value of said unknown D. C. potential as compared with the value of said known D. C. potential when said alternate voltages are equal.

7. In apparatus for measuring temperature in which a thermocouple element is exposed to the temperature to be measured to produce a voltage which is a function of said temperature, the combination comprising a D. C. voltage circuit including first and second terminals connected to a source of unknown D. C. voltage, a symmetrical impedance network having a midpoint terminal and being connected across the terminals of said D. C. voltage circuit, a first condenser, a standard cell circuit having connecting terminals and including a standard potential cell, a second condenser, first connecting means joining one terminal of said standard cell circuit to the midpoint terminal of said symmetrical network, second connecting means joining one plate of each of said condensers, cyclically-operated first switching means having switching contacts and alternate terminals for periodically connecting the other plate of said first condenser alternately from one terminal to another of said D. C. voltage source, second switching means operated in synchronism with said first switching means and having switching contacts and alternate terminals for periodically connecting the other plate of said second condenser alternately from one terminal to another of said standard cell circuit, voltage-sensitive means connected between said first and second connecting means and responsive to the existence of an unbalance voltage therebetween, third switching means operated in synchronism with said first and second switching means and connected to said voltage-sensitive means to render the latter ineffective for a period slightly in excess of the period during which the contacts of said first and second switching means are out of engagement with their respective alternate terminals, and means under the control of said voltage-sensitive means for adjusting the value of said second condenser in a direction tending to reduce said unbalance voltage to zero, whereby the adjusted capacity of said second condenser is a measure of the voltage being measured when said unbalance voltage is zero.

8. In measuring apparatus in which an unknown D. C. voltage is measured by comparing it with a known voltage and producing an alternating unbalance voltage which is amplified by an electronic amplifier to control a rebalancing circuit for reducing the unbalance voltage to zero value, an arrangement including an electronic tube voltage-change-detecting circuit including a voltage amplifier having input and output connections, switch means having first, second, and third sets of contacts, driving means cyclically operating said switch contacts at the same frequency, said first and second sets of said switch contacts being connected to control the application of signal voltage to said input connections of said amplifier, and means for opening and closing the third set of said switch contacts while said first and second sets of switch contacts are in fixed position, said amplifier being under the control of said third set of switch contacts which is arranged to render said amplifier ineffective during a predetermined portion of each switching cycle.

9. In measuring apparatus in which an unknown D. C. voltage is measured by comparing it with a known voltage and producing an alternating unbalance voltage which is amplified by an electronic amplifier to control a rebalancing circuit for reducing the unbalance voltage to zero value, an arrangement including an electronic-tube voltage amplifier having input and output connections, first and second vacuum tubes, and first and second normally series connected condensers coupling said first tube to said second tube, switch means having first, second, and third sets of contacts, driving means cyclically operating said switch contacts at the same frequency, said first and second sets of said switch contacts being closed alternately to control the application of signal voltage to said input connections of said amplifier, and means for opening and closing the third set of said switch contacts while said first and second sets of switch contacts are in fixed position, said third set of switch contacts being connected to interrupt the circuit between said condensers thereby to render said amplifier unresponsive during a portion of each switching cycle.

10. In measuring apparatus in which an unknown D. C. voltage is measured by comparing it with a known voltage and producing an alternating unbalance voltage which is amplified by an electronic amplifier to control a rebalancing circuit for reducing the unbalance voltage to zero value, an arrangement including an electronic tube voltage-change-detecting circuit including a voltage amplifier having input and output connections, a switch means having first, second, and third sets of contacts, driving means periodically operating said switch contacts at the same frequency, said first and second sets of said switch contacts being connected to control the application of signal voltage to said input connections of said amplifier, means for opening and closing the third set of said switch contacts while said first and second sets of switch contacts are in fixed position, said amplifier being under the control of said third set of switch contacts which is arranged to render said amplifier ineffective during a predetermined portion of each switching cycle, and a negative feed-back connection in said amplifier adjusted to pass selectively frequencies above the frequency of operation of said switch.

11. In measuring apparatus in which a D. C. voltage is measured by comparing the unknown voltage with a known voltage and producing an alternating unbalance voltage which is amplified by an electronic amplifier to control a rebalancing circuit for reducing the unbalance voltage to zero value, a condition-sensitive D. C. potential source, a voltage-comparison circuit, a cyclically-operated switch arrangement including alternate contacts and connected to said voltage comparison circuit, two substantially equal groups of resistors arranged symmetrically with respect to said D. C. potential source and connected in series between said D. C. potential source and said alternate contacts of said switch, a common conductor connected to said voltage comparison circuit, and two groups of condensers connected between said resistors and said common conductor.

12. In apparatus for comparing two D. C. potentials, in combination, an electronic amplifier, two condensers, a first switch including a movable contact having two alternate positions, charging and discharging networks, a first motor for periodically actuating said movable contact of said first switch from one alternate position to the other to periodically and alternately connect said condensers with said D. C. potentials in said charging and discharging networks, a circuit connecting the said condensers to said amplifier to permit amplification of potential variations therebetween as said switch contact moves from one to the other of its positions, a second switch arranged to render said amplifier unresponsive during the portions of the cycle of operation of said first switch when said movable contact is intermediate its alternate positions, a second driving member for periodically actuating said second switch, and a second motor responsive to the magnitude and polarity of said potential variations.

13. In an electrical measuring system, apparatus comprising an electronic tube voltage-change-detecting circuit including a voltage amplifier having input and output connections, a first switch having a cyclically-operated switch contact arranged to move between first and second fixed contacts, means connecting said first contacts to control the application of signal voltage to said input connections of said amplifier, a second switch having cyclically-operated switch contacts, means connecting said second switch contacts to render said amplifier ineffective during a predetermined portion of each switching cycle, driving means for cyclically operating said contacts of said first and second switches, the period of operation of each cycle of said first switch being equal in time duration to the period of operation of each cycle of said second switch, and means for maintaining a discrete and predetermined displacement in the time of opening and closing of said contacts of said first switch with respect to the corresponding opening and closing of the contacts of said second switch, said second switch being arranged to render said amplifier ineffective throughout the period of time when said movable contact of said first switch is moving between said first and second fixed contacts, that is, when it does not engage either of said fixed contacts.

LOUIS GOODMAN.

REFERENCES CITED

The following references are of record in the file of this patent:

UNITED STATES PATENTS

| Number | Name | Date |
|---|---|---|
| 2,141,056 | Watkins | Dec. 20, 1938 |
| 2,218,477 | Parker | Oct. 15, 1940 |
| 2,220,602 | Hellman | Nov. 5, 1940 |
| 2,284,476 | MacKay | May 26, 1942 |
| 2,306,479 | Jones | Dec. 29, 1942 |
| 2,367,746 | Williams | Jan. 23, 1945 |
| 2,376,527 | Wills | May 22, 1945 |
| 2,427,191 | Brink | Sept. 9, 1947 |
| 2,456,420 | Jackson | Dec. 14, 1948 |
| 2,512,702 | White | June 27, 1950 |